US006534764B1

(12) United States Patent
Verentchikov et al.

(10) Patent No.: US 6,534,764 B1
(45) Date of Patent: Mar. 18, 2003

(54) TANDEM TIME-OF-FLIGHT MASS SPECTROMETER WITH DAMPING IN COLLISION CELL AND METHOD FOR USE

(75) Inventors: Anatoli N. Verentchikov, Boston, MA (US); Marvin L. Vestal, Framingham, MA (US); Kevin M. Hayden, Newton, NH (US)

(73) Assignee: PerSeptive Biosystems, Framingham, MA (US)

( * ) Notice: Subject to any disclaimer, the term of this patent is extended or adjusted under 35 U.S.C. 154(b) by 466 days.

(21) Appl. No.: 09/590,878

(22) Filed: Jun. 9, 2000

Related U.S. Application Data

(60) Provisional application No. 60/138,861, filed on Jun. 11, 1999.

(51) Int. Cl.[7] .................... B01D 59/44
(52) U.S. Cl. .................... 250/287; 250/282; 250/288
(58) Field of Search .................... 250/287, 282, 250/298

(56) References Cited

U.S. PATENT DOCUMENTS

| | | | | |
|---|---|---|---|---|
| 5,248,875 A | | 9/1993 | Douglas et al. | |
| 5,625,184 A | | 4/1997 | Vestal et al. | |
| 5,627,369 A | | 5/1997 | Vestal et al. | |
| 5,753,909 A | | 5/1998 | Park et al. | |
| 5,760,393 A | | 6/1998 | Vestal et al. | |
| 6,140,638 A | * | 10/2000 | Tanner et al. | 250/282 |
| 6,331,702 B1 | * | 12/2001 | Krutchinsky et al. | 250/287 |
| 6,348,688 B1 | * | 2/2002 | Vestal | 250/287 |
| 6,441,369 B1 | * | 8/2002 | Vestal et al. | 250/287 |

FOREIGN PATENT DOCUMENTS

| | | |
|---|---|---|
| SU | 1 681 340 | 3/1991 |
| WO | WO 91/03071 | 3/1991 |
| WO | WO 99/40610 | 8/1999 |

OTHER PUBLICATIONS

Standing et al, Orthogonal Injection of Matrix–Assisted Laser Desorption/Ionization Ions into a Time of Flight Spectrometer Through a Collisional Damping Interface. Rapid Communications in Mass Spectrometry No. 12 1998 pp. 508–518—London GB.

(List continued on next page.)

*Primary Examiner*—Jack Berman
*Assistant Examiner*—Johnnie L Smith, II
(74) *Attorney, Agent, or Firm*—Andrew T. Karnakis

(57) ABSTRACT

A tandem mass spectrometer is disclosed having a collisional damping cell that slows down and adapts an ion beam, from a time-of-flight mass spectrometer (TOF MS) to a second mass spectrometer, preferably an orthogonal TOF MS. The cell provides a substantial damping of the energy of the ions in multiple collisions with a gas. An RF-only quadrupole is used to spatially focus the ion beam in the collision cell. As result, the operation of second mass spectrometer can be decoupled from the rest of the instrument, or in some cases with the energy being sufficiently damped the pulsed nature of the primary ion beam can be partially preserved and used to enhance the sensitivity of the second mass spectrometer. An ion selector passes only stable parent ions of interest, thereby introducing ions into the cell at a well controlled low energy. The ion beam can be injected into the collision cell with or without separation as well as with or without fragmentation. Thus, the results obtained with the second mass spectrometer can be used to control each individual step of the tandem MS, including ion formation in the source, ion focusing, metastable fragmentation in the first time of-flight spectrometer, primary ion selection and fragmentation in the cell as well as provide mass analysis of fragment ions. By using a high repetition rate laser at increased energy levels, the acquisition of data is significantly accelerated and adjustments on each individual step may be conveniently automated. The MS analysis can be also applied to analysis of analytes from continuous ion sources by using an orthogonal pulser in the first TOF MS to modulate the beam followed by spatial focusing of the pulsed beam.

38 Claims, 6 Drawing Sheets

OTHER PUBLICATIONS

Krutchinsky, A.N. et al., "Orthogonal Injection of Matrix–assisted Laser Desorption/Ionization Ions into a Time–of–flight Spectrometer Through a Collisional Damping Interface", Rapid Communications in Mass Spectrometry, 12, 508–518 (1998).

Mansoori, B.A. et al., "Analytical Performance of a High–Pressure RF–Only Quadrupole Collision Cell with an Axial Field Applied Using Conical Rods", Proceedings of the 46th ASMS Conference on Mass Spectrometry and Allied Topics (May 31–Jun. 4, 1998), p. 1251.

* cited by examiner

TANDEM TIME-OF-FLIGHT MASS SPECTROMETER WITH DAMPING IN COLLISION CELL AND METHOD FOR USE

This application claims priority on U.S. Provisional Application No. 60/138,861, filed on Jun. 11, 1999.

FIELD OF INVENTION

The invention generally relates to mass spectrometers and specifically to tandem mass spectrometers. More specifically, the invention provides an effective coupling of a first time-of-flight mass spectrometer to a second mass spectrometer of any one of various types, including a time-of-flight mass spectrometer with orthogonal acceleration, through use of a collision cell with collisional damping.

BACKGROUND OF INVENTION

Mass spectrometer (MS) instruments analyze compounds and their mixtures by measuring the mass to charge ratio (M/Z) of ionized molecules generated at a source. Time-of-flight (TOF) mass spectrometers accelerate a pulsed ion beam across a nearly constant potential and measure the flight time of ions from their origination at the source to a detector. Since the kinetic energy per charge of an ion is nearly constant, heavier ions move more slowly and arrive at the detector later in time than lighter ions. Using the flight times of ions with known M/Z values, the TOF spectrometer is calibrated and the flight time of an unknown ion is converted into an M/Z value.

Historically, TOF mass spectrometers have been primarily used with pulsed sources thereby generating a discrete burst of ions. Typical examples of mass spectrometers with pulsed sources include plasma desorption mass spectrometers and secondary ionization mass spectrometers. Recently TOF mass spectrometers have become widely accepted, particularly for analysis of labile biomolecules and other applications requiring wide mass range and high speed, sensitivity, resolution and mass accuracy. New ionization methods such as matrix assisted laser desorption/ionization (MALDI) and electrospray ionization (ESI) have greatly extended applications of TOF mass spectrometry. TOF mass spectrometers have become one of the most preferred instrumentation platforms for both of these new ionization methods.

The pulsed nature of the MALDI ion source naturally complements the pulsed operation of a time-of-flight analyzer, and thus TOF has been the mass spectrometer of choice from the earliest applications of the MALDI method. However, early MALDI implementation suffered from extreme sensitivity to laser energy. Recently, the resolution of MALDI/TOF MS instruments has been significantly improved by using a delayed ion extraction (DE) method, as described in U.S. Pat. Nos. 5,625,184; 5,627,369; and 5,760,393. In this method, a plume of ions and neutral molecules is allowed to expand after desorption by a laser shot and then the ions are accelerated after application of a delayed electric pulse. As a result, ions are no longer dragged through the dense plume by a high electric field. This technique reduces the energy spread of the ions and the amount of fragmentation. The delayed ion extraction method is much less sensitive to laser energy, and much higher resolution and mass accuracy are routinely available with MALDI-TOF mass spectrometers.

While pulsed sources are readily adapted to TOF mass spectrometers, it is more difficult to apply TOF to intrinsically continuous sources, like ESI. The problem was resolved with the introduction of an orthogonal extraction scheme, as described in Russian Patent SU1681340A1 and corresponding Published PCT application W091/03071, entitled “Method of time-of-flight analysis of continuous ion beam”. In orthogonal TOF (o-TOF) MS instruments, a continuous, slow-moving ion beam is converted into ion pulses by means of an orthogonal pulsed electric field. Ion pulses are accelerated in a direction orthogonal to the ion beam path to a much higher energy and are focused onto an intermediate focusing plane, which serves as an object plane of a reflecting TOF MS. The orthogonal pulser/accelerator serves as a high repetition rate (typically 10 kHz) pulsed ion source for the o-TOF mass spectrometer. The efficiency of conversion, referred to as the “pulser duty cycle”, is usually in the order of 10 to 20%. The conversion losses are well compensated by the ability of TOF mass spectrometers to detect all ions in a given pulse. As a result, the orthogonal TOF scheme provides a significant improvement in sensitivity compared to traditionally used scanning instruments, such as quadrupole and magnet sector spectrometers, which transmit only one narrow M/Z component at a time and discard the rest of the ion beam. The acquisition duty cycle of scanning instruments (i.e., the portion of the ion beam used for analysis considering that only a single component is passed at a time) is inversely proportional to mass resolution and is in the order of $10^{-4}$ to $10^{-3}$%, compared to an acquisition duty cycle of ~10% for o-TOF MS instruments. In addition to high sensitivity, the o-TOF scheme provides greater mass range, exceptional speed, medium to high resolution and high mass accuracy.

While ESI-TOF MS and DE MALDI-TOF MS provide excellent data on the molecular weight of samples, one disadvantage to these instruments is that they provide little information on molecular structure. Traditionally tandem mass spectrometers (MS-MS) have been employed to provide structural information. In MS-MS instruments, a first mass spectrometer is used to select a primary ion (or ions) of interest, for example, a molecular ion of a particular compound, and that ion is caused to fragment by increasing its internal energy, for example, by colliding the ion with neutral molecules. A second mass spectrometer then analyzes the spectrum of the fragment ions, and often the structure of the primary ion can be determined by interpreting mass spectra of fragment ions. The MS-MS technique improves recognition of a known compound with a known pattern of fragmentation and also improves specificity of detection in complex mixtures, where different components give overlapping peaks in the first MS instrument. In the majority of applications, such as drug metabolism studies and protein recognition in proteome studies, the detection level is limited by chemical noise. Frequently, the MS-MS technique improves the detection limit in such applications.

In MALDI-TOF MS, the technique known as post-source decay (PSD) can be employed in a single MS instrument to provide information on molecular structure. The primary ions are separated in space in a linear TOF mass spectrometer and are selected by a timed ion selector. Ions are excited during the ion formation process and partially fragment in a field-free region (referred to as metastable fragmentation). Fragment ions continue to fly with the about the same velocity and, hence, with energy proportional to their mass (known as the energy partitioning effect). Subsequently, the ion fragments can be time separated in an electrostatic mirror (reflector). The PSD method, although involving a single mass spectrometer, is referred as a pseudo MS-MS scheme. Fragmentation spectra are often weak and difficult to interpret. Adding a collision cell where ions may undergo collision induced dissociation (CID) improves fragmentation efficiency. Still, the performance of both PSD and CID spectra is strongly affected by energy partitioning and, in the CID case, by an additional collisional energy spread. Parent ions and fragment ions have different energies and thus can not be simultaneously focused in a reflecting TOF mass spectrometer with an electrostatic ion mirror. To resolve the problem the mirror voltage is stepped and the spectrum is composed of stitches, a practice which hurts sensitivity, acquisition speed and mass accuracy.

Nowadays, the most common form of tandem mass spectrometer is a triple quadrupole (Triple Q), where both mass spectrometers are quadrupoles and the collision cell uses a radio frequency (RF)-only quadrupole to enhance ion transport. Because of its low scanning speed the Triple Q instrument employs continuous ion sources such as ESI and atmospheric pressure chemical ionization (APCI) sources. Since scanning of the second mass spectrometer would cause additional losses, the most effective way of using a Triple Q instrument is in monitoring selected reactions. Drug metabolism studies are a good example where a known drug compound is measured in a rich biological matrix, such as blood or urine. In those studies both parent ion and daughter fragment ion masses are known and the spectrometer is tuned to detect those specific masses. For more generic applications requiring scanning, the triple quadrupole instrument is less desirable because of its low speed, sensitivity, mass accuracy and resolution.

In the development of triple quadrupole instruments, use of the collision cell was perfected, thereby enabling these instruments to achieve significant commercial success. The low energy collisions provide a well-controlled degree of fragmentation and significant structure information. The RF-only quadrupole guide provides complete radial retention of the ion fragments. Collisional cooling in the cell confines ions onto the axis of the cell and strongly reduces axial energy spread, as described in U.S. Pat. No. 5,248,875.

Recently hybrid instruments have been described having a quadrupole as the first MS instrument and where the second quadrupole mass spectrometer is replaced by an o-TOF mass spectrometer. This instrument is commonly referred to as a "Q-TOF". The o-TOF back end permits the observation of all fragment ions of interest at once and the acquisition of secondary spectra at high resolution and mass accuracy. In cases where the full mass range of daughter ions is required, for example, for peptide sequencing, the Q-TOF instrument affords significant performance advantages over the triple quadrupole instrument. However, the Q-TOF instrument exhibits a 10 to 100 loss in sensitivity compared to the use of a single quadrupole operating in a selected reaction monitoring mode (i.e., monitoring a single M/Z value). For the same reason the sensitivity of the Q-TOF is lower in the mode of "parent scan" where, again, the second MS instrument is used to monitor a single M/Z value. Recently the Q-TOF platform has been applied in combination with a MALDI ion source as published by Standing et al in Rapid Comm. Mass Spectrom. 12, 508–518 (1998).

In another recent variation, it has been proposed to configure an MS-MS instrument by combining a linear ion trap (LIT) and a TOF spectrometer. A LIT is formed by modifying a conventional quadrupole with electrostatic "plugs" and is capable of trapping ions for a long period of time. The quadrupole field structure enables the application of various separation and excitation methods, previously developed in 3-D ion trap technology. While the LIT eliminates ion losses at selection and also can operate at poor vacuum conditions thereby reducing the requirements on the pumping system, it does suffer from limited resolution (R) of ion selection, with R<200 only being demonstrated at the present time.

Lately, a MALDI ion source has been coupled to a three-dimensional (3-D) quadrupole ion trap mass spectrometer (IT MS). The IT MS is a routine tool for tandem mass spectrometric analysis, providing moderate performance of individual mass spectrometric steps, but having an advantage of multiple step tandem-MS analysis, usually referred as $MS^n$ analysis. In such analysis a pulse of primary ions is trapped in the ion trap cell and is subjected to a timed sequence of operations. Those operations include selection and fragmentation of primary ions, with subsequent ejection of unwanted components, followed by selection and fragmentation of a single fragment ion of the next generation. After n steps of selection and fragmentation, the fragments are mass analyzed. Coupling the MALDI source to the IT MS has been problematic in conducting analyses using this technique. Ions produced in a MALDI source at vacuum are transported via an electrostatic lens and trapped in an IT MS cell, using an RF field with a slowly ramped amplitude. Such method of coupling introduces a significant decay of primary ions. The method works only in combination with so-called "soft" matrices. Since the trap is filled with ions of all masses, including matrix ions, space charge effects, including discrimination and mass shift, become pronounced. The cycle of ion storage and mass analysis is slow, the usual repetition rate of the laser is 2 Hz, and the sample is poorly utilized. Additionally, the method is sensitive to laser energy and depends on choosing an appropriate sweet spot on the sample deposited on the matrix.

High sensitivity, resolution and mass accuracy are important characteristics of TOF mass spectrometers. This is particularly true for a DE MALDI source operating in vacuum, where the ion beam already has a short duration and also has low divergence and energy spread. The transmission of TOF mass spectrometers is close to unity. Therefore, in the case of pulsed ion sources it is desirable to utilize a TOF mass spectrometer for each analyzer that forms a portion of the tandem mass spectrometer.

To overcome problems encountered in collision cells used in prior DE MALDI TOF mass spectrometers associated with the energy partitioning effect and the inability to focus all fragment ions simultaneously (see above description of PSD method), it has been proposed to add a second DE source after the collision cell, as described in co-pending patent application, Ser. No. 09/233,703, entitled "A tandem mass spectrometer with delayed extraction and method of use", commonly assigned as with the present application.

In that patent application, the primary ion beam is separated in a linear TOF mass spectrometer and ions of a particular mass-of-interest are selected by a timed ion selector. The primary beam is time focused onto a plane of the ion selector, thereby enhancing the resolution of selection. The selected ion beam is directed into a collision cell, where ions experience one to a few high-energy collisions. Based on the fact that ions of interest have a much higher mass than the gas molecules with which they collide, the ion beam still preserves most of its original direction and time pulse properties. The energy of fragments still depends on mass, but because of the medium energy (1 to 3 keV) of the initial beam the energy spread is limited. After exiting the collision cell, ions are accelerated after an appropriate time delay by a second electric pulse as in DE MALDL The second acceleration increases ion energy substantially; however, the energy spread remains within the energy-focusing properties of the electrostatic mirror, known to handle an approximate 10% energy spread without loss of resolution.

While the scheme described in this patent application is expected to provide unique information concerning high energy CID and to generate maximum possible sensitivity for MALDI MS-MS experiments, high-energy collisions produce a wide spectrum of excitation and could generate a larger amount of small mass fragments. The necessity of synchronization of both TOF mass spectrometers adds a degree of complexity to the operation of this instrument. Also, the focusing properties of the second mass spectrometer take into account the focusing conditions of the first mass spectrometer and the timed ion selector.

Despite the activities to expand the capabilities of mass spectrometry outlined above, the need still exists for an improved tandem mass spectrometer that incorporates the high sensitivity, resolution and mass accuracy of TOF mass spectrometers and that is capable of utilizing to full advantage intrinsically pulsed ion sources, such as MALDI, with minimal loss of sensitivity. It is also desirable to combine the most sensitive TOF mass spectrometer with a low energy collision cell to control the degree of fragmentation and to increase the yield of information containing middle-mass fragments, while improving the energy and angular spread of the ion beam exiting the energy adjusting electrodes to improve performance of the second mass spectrometer and to decouple its operation from the first mass spectrometer.

SUMMARY OF THE INVENTION

The invention overcomes the disadvantages and limitations of the prior art by providing a high performance mass spectrometer and MS method employing time-of-flight separation of primary ions, which matches the pulsed nature of practically important pulsed ion sources, in particular a MALDI ion source.

A feature of the present invention includes coupling a time-of-flight mass spectrometer to energy adjusting electrodes with a gas at sufficiently high pressure that produces multiple collisions between the ions and the background gas to substantially damp the kinetic energy of the ion beam. In accordance with another feature of the invention, an RF multipole is included in the collision cell to spatially confine the beam. In addition, the kinetic energy of ions injected into the cell (also referred to below as "injection energy") may be adjusted by regulating static voltages or by applying electric pulses (also referred to below as "dynamic energy correction") to control the degree of fragmentation in the cell. In the particular case of low energy injection, the primary ions remain intact, and in the case of higher energy injection, the ions fragment in the collision cell. This feature allows switching between MS and MS-MS analysis while using the second MS for data acquisition. The pulsed nature of the primary beam may be partially preserved to enhance sensitivity of tandem MS operation.

The most general preferred embodiment of a tandem mass spectrometer of the invention includes a pulsed generator of ions coupled to a time-of-flight mass spectrometer, a timed ion selector, a collision cell with a gas of sufficiently high pressure to collisionally damp the admitted ion beam and to induce fragmentation in communication with the time-of-flight mass spectrometer and the timed ion selector, and a second mass spectrometer to analyze fragment ions.

In one preferred embodiment of the invention, a tandem mass spectrometer includes a DE MALDI ion source, a linear TOF MS with a timed ion selector, energy adjusting electrodes and a differentially pumped collision cell, an RF-only multipole within the collision cell, and an orthogonal TOF MS as the second MS. The energy adjusting electrodes utilize electric pulses to adjust the injection energy at a given potential on the sample plate. The cell is filled with gas to about 10 to 100 mtorr pressure to convert a pulsed, medium-energy beam into a slow quasi-continuous beam, confined near the axis of the cell by the RF field. The resultant continuous, slow ion beam is analyzed in the o-TOF mass spectrometer pulsing at high frequency, asynchronously from the operation of the first TOF mass spectrometer.

The invention can be embodied with multiple features, which taken singularly or in combination, enhance the performance of the MS instrument and method.

In one particular feature, the MALDI source employs a high repetition rate laser operating at an increased laser energy. This provides for higher sensitivity.

In another particular feature, the resolution of the TOF primary ion selection is improved for operation at elevated laser energy by introducing a second, corrective decelerating electric pulse in the first TOF MS to enhance time-of-flight resolution around the selected ion mass of interest.

Yet, in another particular feature, the timed ion selector is a time-synchronized pulsed accelerator, accelerating ions of interest only. This permits passing through only ions of a predetermined M/Z value to enhance resolution of ion selection.

Yet, in another particular feature, an additional annular detector is used to detect the ion beam reflected by the timed ion selector in order to obtain spectra of parent ions.

Yet in another particular feature, the injection energy to induce fragmentation of selected ions is adjusted independently of parameters in the first TOF mass spectrometer by including a normally field free region between the timed ion selector and a collision cell. A voltage pulse is applied to the ions of interest as they are passing through the normally field free region to regulate the kinetic energy of the detected ions prior to entering into the collision cell.

Yet, in another particular feature, the quality of spectra derived in MS only mode of operation is improved by increasing the pressure in the collision cell between 0.1 to 1 torr. Higher gas pressure improves cooling of ions after being excited in the ion source.

Yet, in another particular feature, sensitivity is improved by filling the collision cell with a light gas such as methane. This allows injecting ions into the collision cell at higher energy and thus improving sensitivity.

Yet, in another particular feature, sensitivity is improved by introducing into the collision cell a dual cell composed of two segments, the first segment being a high-order multipole having a relatively large inscribed radius, and the second being a smaller-size radius quadrupole.

Yet, in another particular feature, the asynchronous operation of the two TOF mass spectrometers is improved by smoothing the time characteristics of the ion beam by introducing a slight retarding potential at the exit end of the collision cell.

Other types of mass spectrometers may be used as the second MS analyzer, for example 3-D ion trap, Fourier transform, quadrupole or magnet sector mass spectrometers. This embodiment can utilize the time characteristic smoothing enhancement mentioned above.

In another preferred embodiment, a short collision cell operated at a higher gas pressure provides a degree of energy damping while still preserving the pulsed nature of the beam. In one mode of operation, the second mass spectrometer, an o-TOF MS, is synchronized with the ion source and the first TOF mass spectrometer to eliminate duty cycle losses.

In another embodiment, a continuous ion source, for example an ESI or APCI source, is converted into pulsed ion packets to function as a pulsed ion generator. The beam is spatially focused to reduce the size of apertures in the collision cell.

The invention also relates to a method for tandem mass spectroscopy. The method includes generating a pulse of ions from a sample of interest in a time-of-flight mass spectrometer. Ions of interest are selected from the pulse of ions in the time-of-flight mass spectrometer. The selected ions are collided with a gas having a sufficiently high gas pressure to substantially dampen the kinetic energy of the selected ions and inducing fragmentation of the selected ions. The selected ions and fragments thereof are then analyzed with a second mass spectrometer.

In one embodiment, the invention relates to a method of high performance tandem mass spectrometry which includes generating a pulsed acceleration of an ion beam from a pulsed ion source; directing the ions into a time of flight mass spectrometer; selecting only parent ions of a predetermined M/Z value for further analysis; introducing the beam of selected ions into a collision cell with an RF-only multipole at a controlled energy and pressure, where the pressure is adjusted to provide complete damping of the kinetic energy of the ions and to achieve a desired degree of fragmentation; and analyzing the fragment ions in a second mass spectrometer. This method of tandem mass spectrometry may also include preserving the pulsed nature of the primary ion beam to enhance sensitivity of the second o-TOF mass spectrometer.

One feature of the above method includes switching between MS-only and MS-MS modes by switching "on" and "off" the timed ion selector and also by controlling the kinetic energy of ions injected into the collision cell. The second mass spectrometer is used to acquire spectra at all individual steps, such as acquisition of parent spectra, monitoring the quality of ion selection and acquisition of fragment ion spectra.

Coupling a TOF mass spectrometer to a low-energy collision cell followed by tandem mass spectrometry analysis by a second analyzer introduces a number of technical challenges, such as increased gas load, ion beam focusing at the entrance of the cell, and preservation of the pulsed nature of the ion beam or smoothing of the beam in the collision cell. As a result, the present invention represents a technical advance by solving these challenges in an unusual way or by an unusual combination of elements. These multiple useful variations of individual components will be discussed more fully in the following detailed description of the invention and in the accompanying experimental section.

In particular, it is an object of the invention to minimize the effect of the primary TOF mass spectrometer and the collision cell on performance and operation of the second mass spectrometer, when the invention is used for tandem MS analysis. It is also an object of the invention to enable fine control over the fragmentation process in a tandem mass spectrometer.

BRIEF DESCRIPTION OF THE DRAWING FIGURES

Figure 1A:
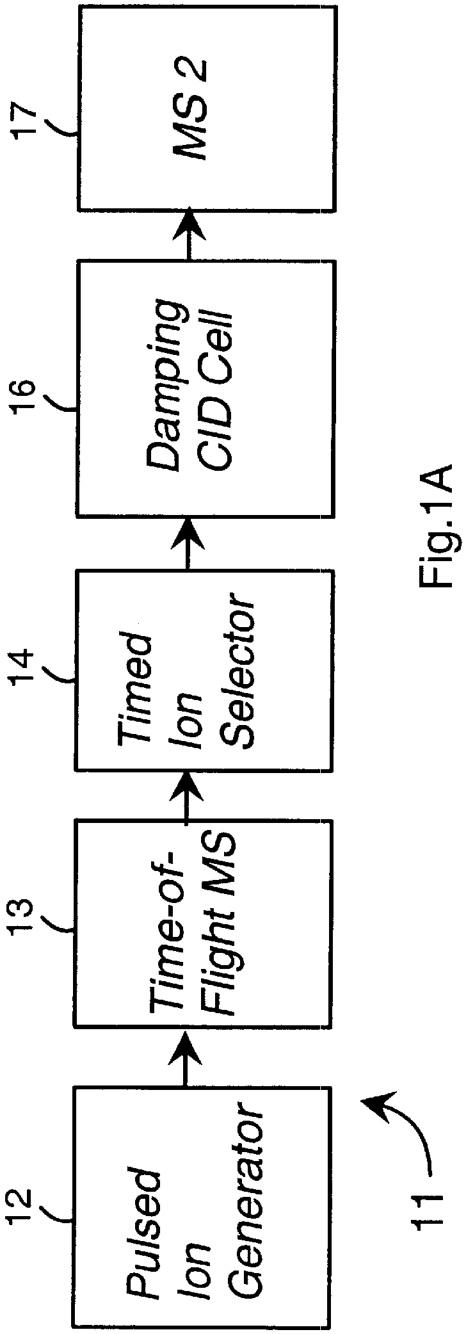
FIG. 1A is a block-diagram of a general embodiment of the invention.
Figure 1B:
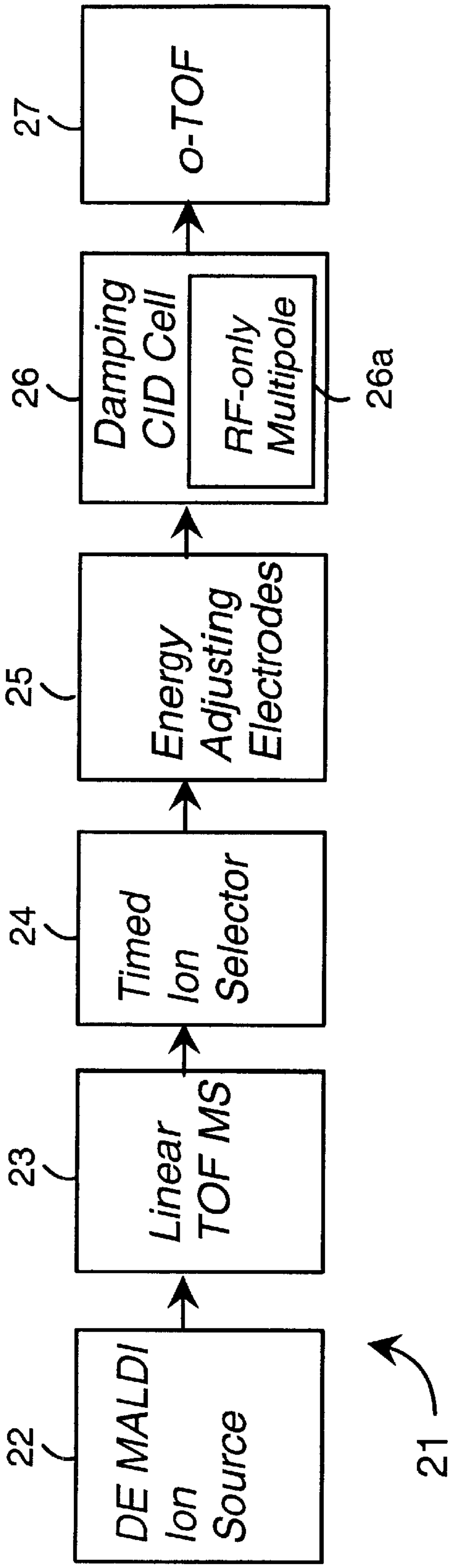
FIG. 1B is a block diagram of one embodiment of the invention.
Figure 6A:
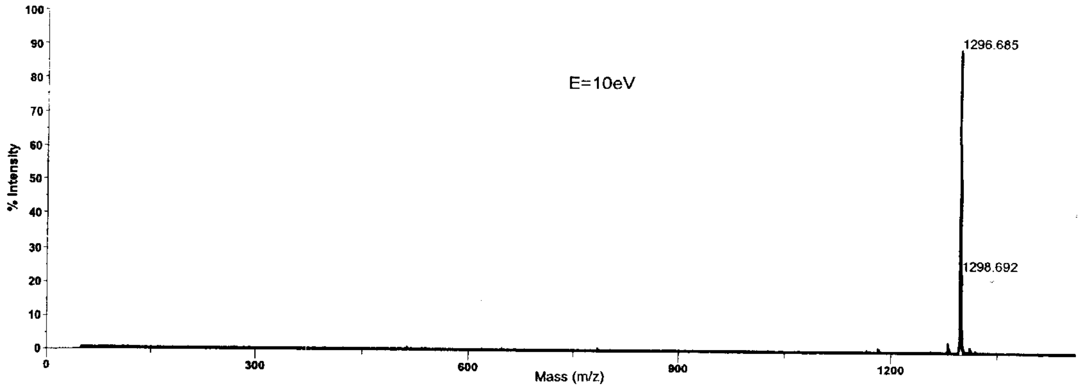

FIGS. 6A, B and C are tandem mass spectra acquired at various injection energies generated by using the embodiment shown in FIG. 1B.

DETAILED DESCRIPTION OF THE INVENTION

Referring to FIG. 1A, in brief overview, the most general embodiment of a tandem time-of-flight mass spectrometer 11 of the present invention includes a pulsed ion generator 12, a time-of-flight (TOF) mass spectrometer 13, a timed ion selector 14, a collision induced dissociation cell (CID) 16 with collisional damping, and a second mass spectrometer 17 (MS2). In accordance with an important aspect of the invention, collisional damping in the cell 16 substantially reduces the kinetic energy of the ions through collisions with the gas in the CID cell and efficiently transfers ions into the second mass spectrometer 17.

In operation, the pulsed ion generator 12 ionizes the sample and forms ion pulses with a medium energy of 1 to 10 keV (electron-Volts) and having a short time duration (in the nanosecond range). The pulsed ion beam is introduced into the TOF mass spectrometer 13 where ions are separated based on their M/Z value and are time focused in the vicinity of the timed ion selector 14. Ions of interest having a predetermined M/Z value are selected in the timed ion selector 14 by applying a pulsed voltage synchronous with the arrival of the selected ions. The timed ion selector can take a variety of forms and examples of such ion selectors are described below. The beam of selected ions (referred to herein also as primary ions) is slowed down to a medium energy of between 10 to 300 eV and is injected into the cell 16, where ions experience medium-energy collisions with the background gas molecules. The kinetic energy of the injected ions is varied by adjusting the potential between the pulsed ion generator and the CID cell to achieve the desired degree of ion fragmentation. The cell 16 is filled with a gas to a pressure above 10 mtorr, which is sufficient to cause multiple collisions between ions and the gas.

The resultant multiple collisions substantially dampen the kinetic energy of the primary ions (when admitted to the CID cell with low injection energy) and their fragment ions to a nearly thermal velocity and at the same time cool the internal energy of the ions. By substantially dampening the kinetic energy of the ions and fragment ions thereof, we mean that the kinetic energy is at or below ten times the thermal energy. The slow beam of stable ions is passed into the second mass spectrometer 17 for mass analysis. The tandem mass spectrometer can operate in MS-only mode if the timed ion selector 14 is turned off and the injection energy is adjusted below the fragmentation threshold of the selected primary ions. The ability to observe the spectrum of primary ions, as described subsequently in greater detail, helps to choose primary ions and to monitor the quality of ion selection in subsequent MS-MS analysis.

Referring to FIG. 1B, in brief, one preferred embodiment of the present invention is a mass spectrometer (MS) system 21 that includes a matrix assisted laser desorption ion source 22 operating in a delayed ion extraction mode (DE MALDI), a linear time-of-flight mass spectrometer (TOF1) 23, a timed ion selector 24, energy adjusting electrodes 25, a damping CID cell 26, and an orthogonal time-of-flight (o-TOF) mass spectrometer 27. The damping CID cell 26 includes a radio frequency (RF)-only multipole 26*a*. Both mass spectrometers are pumped below $10^{-6}$ torr while the CID cell 26 is filled with gas to about 10 to 100 mtorr in order to convert the pulsed ion beam into a slow quasi-continuous beam, suitable for orthogonal TOF analysis. While it is preferred that the second mass analyzer be an o-TOF MS, other mass analyzers could be used, such as quadrupole, ion trap, Fourier transform or magnetic sector mass spectrometers.

In operation, the DE MALDI source 22 produce pulses of ions with minor fragmentation and a narrow energy spread. As in conventional operation of DE MALDI, the delayed voltage pulse accelerates a pulse of ions to an energy level of 1 to 10 keV. Both the DE acceleration pulse and the time delay are tuned to time-focus ions of predetermined M/Z values in a focal plane in the vicinity of the timed ion selector 24, thereby transmitting only ions of interest. The selected ions are slowed down in the energy adjusting electrodes 25 and introduced into the CID cell 26. The ion kinetic energy is adjusted between 10 to 300 eV in order to control the degree of fragmentation. The radio frequency (RF) field of the multipole 26*a* retains ions and prevents them from spreading radially during the initial contact with the background gas and subsequently confines ions onto the axis of the multipole. The pulsed beam is spread in time and forms a quasi-continuous ion beam with near thermal velocity (0.03 eV). Beyond the cell 26 the beam is accelerated to about 5 to 10 eV energy and is injected into the o-TOF mass spectrometer 26 for mass analysis of fragment ions. The o-TOF is operated asynchronously with the ion source pulses generated in TOF1, and the performance of the o-TOF is fully decoupled from the conditions in the DE MALDI ion source 22 and TOF1.

Figure 2:
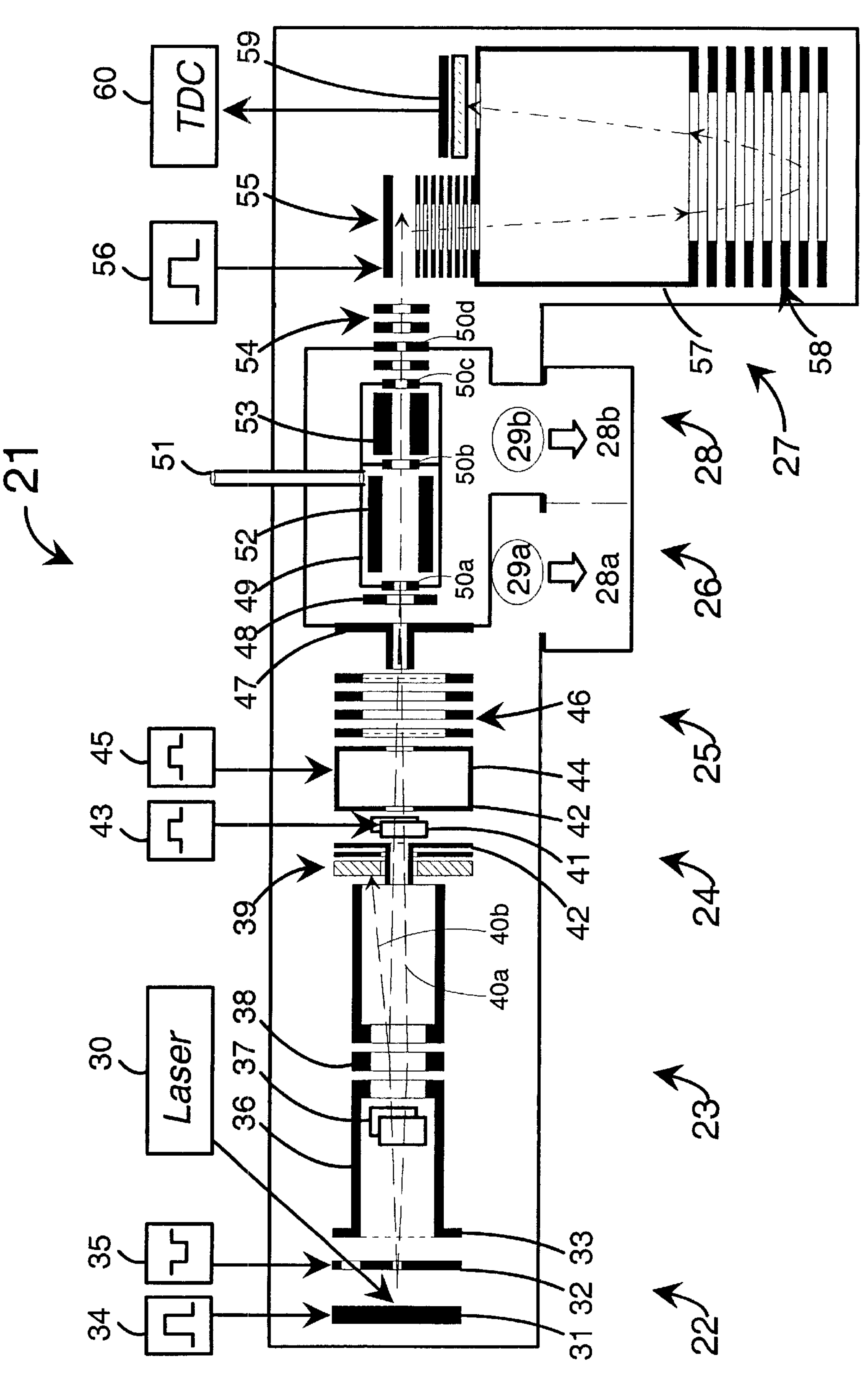
FIG. 2 is a schematic diagram of the embodiment of the invention shown in FIG 1B.

With more particularity and referring also to FIG. 2, the MS system 21 used to generate the experimental data set forth below includes the elements described previously. In addition, a split flow turbo pump 28 with two differential ports 28*a* and 28*b* evacuates the system.

The ion source 22 includes a laser 30, a sample plate 31, an extracting plate 32 and a mesh 33. The sample plate is coupled to a pulse generator 34, and the extraction plate is coupled to a pulse generator 35. The linear TOF spectrometer 33 includes a flight tube 36, a pair of steering plates 37, an einzel lens 38 and an annular detector 39. The timed ion selector 24, which includes a pair of deflection plates 41 enclosed on either end by meshes 42, is coupled to a pulse generator 43. The energy adjusting electrodes 25, which includes an elevator 44 coupled to a pulse generator 45, a decelerating electrode stack 46 with a uniform electric field, an electrode 47 with a protruding flow restricting tube and a reverse cathode lens 48, controls the kinetic energy of ions injected into the cell 26. The CID cell 26 includes a port 51 for supplying gas, a hexapole ion guide 52, a quadrupole ion guide 53 and ion optic electrodes 54 at the exit of the cell. An inner chamber 49 having apertures 50*a*, 50*b*, and 50*c* surrounds the CID cell 26. An aperture 50*d* provides ion transmission to the o-TOF MS 27. The orthogonal TOF MS includes orthogonal acceleration stage 55 coupled to a pulse generator 56, a free flight tube 57, an ion mirror 58, a detector 59, and a time-to digital converter 60 coupled to the detector.

Collisional damping in the CID cell 26 operates at elevated gas pressure (e.g., above 10 mtorr), while each TOF MS can operate in vacuum only. Therefore, to improve ion transmission between TOF1 and the o-TOF MS, an additional layer 29*b* of differential pumping surrounds the cell 26. In the experiments described below, the system was pumped by a single spilt-flow pump (Balzerz GmbH) with two ports of 250 L/s pumping speed. To reduce the gas load the aperture 47 is configured with a protruding, 30 mm long channel of 3 mm inner diameter, which limits the flow of neutral gas but which is fully transparent to a focused ion beam. Apertures 50*a* and 50*c* are 3 mm in diameter and aperture 50*d* is 2 mm diameter. The pumping system can sustain sufficient vacuum in both TOF mass spectrometers (below $10^{-6}$ torr) at a gas pressure in the inner chamber 49 up to 30 mtorr.

An example of the voltage distribution on the elements of the system used in the MS instrument 21 is provided below.

Before the laser 30 fires, the voltages are held at about the following potentials:

The sample plate 31 and the extraction plate 32 are each at approximately −500V, which value can be adjusted for purposes of time focusing.

The mesh 33 and the free flight tube 36 of TOF1 are each at the acceleration potential of −3000V.

The steering plates 37 are adjusted to be within a few hundred Volts of the acceleration potential.

Lens 38 is adjusted from −3kV (non-focusing) to −1.5 kV (focusing).

The shield and mesh surrounding the detector 39 are both at the acceleration potential of −3000V.

Both deflection plates 41 are turned on, i.e. their potentials are at −2000V and −4000V, respectively.

The elevator 44 is at the acceleration potential (−3000V).

The decelerating stack 46 has a uniform distribution of potential from −3000V to −200V.

Electrode 47 is at −200V.

The cathode lens 48 is at +30V, which value can be adjusted depending on the desired injection energy of the ions admitted into the CID cell.

The entrance aperture 50*a* of the CID cell is at +8V.

The DC potential of the hexapole 52 is +7V and the RF voltage has a 500V amplitude and a 2.5 MHz frequency.

The aperture 50*b* is at +6V.

The DC potential of quadrupole 53 is +5V and the RF voltage has a 500V amplitude and a 2.5 MHz frequency.

The aperture 50*c* is at +4V.

The lens 54 is at −15V, which value can be adjusted for ion beam focusing.

The storage region of the orthogonal pulser 55 is at ground potential.

After the laser fires, the following pulses are applied:

The sample plate 31 is pulsed from−500V to +10V with an approximately 100 ns delay after the laser is fired. The delay time can be adjusted to provide time focusing of the ions of interest.

The extraction plate 32 is pulsed from −500V to −600V at the time when the ions of interest reach the middle of the second acceleration stage between plate 32 and the mesh 33.

The deflection plates of the timed ion selector 41 are pulsed to the acceleration potential of −3000V when the ions of interest are flying through the ion selector.

The elevator 44 is pulsed from −3000V to a potential varying from −3100V to −2800V when the ions of interest are flying through the elevator. The pulse amplitude can be adjusted to control the injection energy of the ions admitted to the cell 26.

The push plate of the orthogonal acceleration stage 55 is pulsed to approximately +700V, at about a 10 kHZ repetition rate. Triggering of the push plate is asynchronous to the initiation of ion source pulses in TOF1.

The DE MALDI ion source 22 operates in a conventional manner as described in U.S. Pat. Nos. 5,625,184; 5,627,369; and 5,760,393, which are incorporated by reference herein. The pulsed laser beam of laser 30 is focused onto the sample plate 31. It is preferred that a high repetition rate (1 to 10 kHz) laser, running at an energy two to three times higher than the threshold level of ion production in MALDI applications (typically, 1 $\mu$J/pulse at ~200 $\mu$m size of the beam), is used. After firing the laser and after a delay of about 100 ns, a voltage pulse, typically 500V, from pulse generator 34 is applied to the sample plate 31, which accelerates ions away from the sample plate 31 toward the extraction plate 32 (first acceleration region). The extraction plate 32 has a small aperture of approximately 1.5 mm in order to avoid ion beam scattering. The ion beam is further accelerated by the application of a DC voltage, typically 3 kV, between the extraction plate 32 and the mesh 33 (second acceleration region) of the linear TOF mass spectrometer 23. The pulse delays and the voltages of the DE MALDI source are selected in accordance with techniques well known to those of skill in the art to time-focus the beam in the vicinity of the ion selector 24.

In order to improve the resolution of the ions selected in the linear TOF MS 23, a second, decelerating pulse is applied to the extraction plate 32 from the pulse generator 35. The second pulse, which is synchronized with the arrival of the ions of interest near the middle of the second acceleration region between the plate 32 and the mesh 33, is superimposed on the 3 kV acceleration pulse and functions to improve the resolution of these primary ions. An annular detector 39, installed in front of the timed ion selector 24, is used to monitor the quality of the time focusing. The detector is also used to acquire spectra of the primary ions. In this case the lens 38 defocuses the beam spatially so that a portion of the ion beam strikes the detector 39, as shown by ion trajectory 40*b*. Once the spectrum of primary ions is acquired the ions of interest are selected and analyzed in a tandem MS mode. The lens 38 and the steering plates 37 focus the beam spatially onto the entrance of the CID cell 26 as shown by ion trajectory 40*a*.

The timed ion selector 24 is used to pass ions of interest and to reject the rest of the ion beam. After passing through the annular detector 39, the high-energy beam is introduced into the timed ion selector 24. The selector is composed of one pair of deflection plates 41 surrounded by meshes 42. A deflecting pulse from the pulse generator 43 is off during the time ions of interest travel between the meshes of the timed ion selector to pass those ions without deflection. Ions of different M/Z values than the selected ions have a different velocity and arrive (or leave) the timed ion selector 24 when the deflecting pulse is on. Thus, these ions are deflected and hit the wall of the aperture 47 and are lost to the instrument system 21.

The beam of selected ions is decelerated in the energy adjusting electrodes 25 and is injected into the cell 26 at a kinetic energy between 10 to 300 eV, depending on the desired degree of fragmentation. The potential difference between the sample plate 31 and the cell 26 determines the kinetic energy of injected ions. However, it is advantageous to provide kinetic energy control that is independent of the control of the sample plate voltage. This provides decoupling of the two mass spectrometers in time, energy and space. To provide the desired decoupling of ion selection from adjustment of ion kinetic energy, an additional element is inserted between the timed ion selector 24 and the CID cell 26, namely the elevator 44. The elevator 44 is a short piece of field free tube, coupled to an additional pulse generator for supplying a voltage pulse 45 to the elevator. The potential of the elevator is step pulsed when the ions of interest fly through the elevator. As a result an additional acceleration potential is introduced between the exit mesh of the elevator 44 and the entrance mesh of the decelerating electrode stack 46. Ions are injected into the CID cell at the desired kinetic energy. To avoid ion losses the potential of aperture 47 is maintained at about 200 V below the potential of the sample plate 31. The ion beam at 200 eV energy has a low divergence and passes through the channel of the decelerating electrode stack 46 without ion losses. Final deceleration of the ion beam occurs in the vicinity of the decelerating lens 48, which is designed as a reverse cathode lens. The lens focuses the slow ion beam at the entrance of the cell 26 and into aperture 50*a*.

The injection of an energetic pulsed beam into the CID cell 26 with collisional damping is an important aspect of the present invention. In order to convert a pulsed, 10 to 300 eV ion beam into a slow, well-confined ion beam, the product of gas pressure and the length of the RF-only multipole generally should be greater than 0.2 torr.cm. Typical pressure in a 10 cm long CID cell is about 30 mtorr. However, it was found that a higher gas pressure (around 100 mtorr) helps to keep the ions intact, which is desirable in the MS-only mode of operation. At low injection energy (below 20 eV per 1 kD mass), fragmentation is mostly defined by the initial ion excitation in the MALDI ion source, rather than by the ion injection energy. The higher the pressure in the CID cell the faster cooling is achieved by collisions with the background gas and as a result less ion fragmentation occurs. The down side of using a higher gas pressure is that there is a higher gas load, thereby requiring a more powerful pumping system to achieve vacuum conditions in the MS analyzers. It was also found that a lighter polyatomic gas, such as methane, allows operating at approximately twice as high injection energy (as compared to nitrogen) and thus ion losses caused by ion beam divergence, which are typical at low injection energies, are reduced.

Higher pressure is not as problematic in the MS-MS mode of operation. The desired degree of fragmentation is controlled by varying the kinetic energy of primary ions from 20 to 100 eV per 1 kD of ions mass. As was described above, ions colliding with gas at such kinetic energy gain internal energy and undergo fragmentation. The subsequent collisions with the background gas cause complete damping of kinetic energy and collisional cooling of internal energy of fragment ions.

An important feature of the present invention is the retention of ions in the CID cell 26 by a radio frequency field. Energetic collisions cause ion scattering. It was found advantageous to use a larger diameter (15 mm inscribed diameter) hexapole 52 in the first section of the cell 26 located at the entrance of the CID cell to enhance initial trapping of the ion beam. To improve the quality of the output beam, a smaller size (7 mm inscribed diameter) quadrupole 53 is employed in a second, downstream section of the cell. The aperture 50*b* between the two multipoles terminates non-matching RF fields and also limits the gas flow between the two sections. Both the hexapole 52 and the quadrupole 53 employ an RF signal of 2.5 MHz frequency and about 500V amplitude, providing confinement and transmission over a wide mass range of fragment ions. The DC potential of the hexapole is a few volts higher than that of the quadrupole to promote ion flow between the two sections. Quadrupoles are known to provide collisional cooling and spatial confinement of the ion beam suitable for injection into an orthogonal TOF MS. Beyond quadrupole 53 the ion beam is transported via an additional stage 29*b* of differential pumping and focused by a lens system 54 composed of apertures and additional lens electrodes. It was found advantageous to introduce a slight retarding potential at the aperture 50*c*. In general, the retarding potential is 0.1V to 0.3V higher than DC potential of the quadrupole 53. The potential barrier at the quadrupole exit traps ions until their space charge overcomes the potential barrier. Once this occurs, ions exit the quadrupole 53 as a smooth continuous beam, suitable for conventional operation of an orthogonal TOF MS. Requirements to create such smoothing are lower when using a high repetition rate laser. For example, at a 1 kHz laser rate a continuous beam is achieved even without the use of the potential barrier and the aperture 50*c* can be used as a lens enhancing ion transmission through separating apertures.

The orthogonal TOF MS is used for mass analysis of fragment ions. The ion beam is introduced into the o-TOF 27 at a kinetic energy between about 5 to 10 eV, defined by the DC potential of the quadrupole 53. Pulse generator 56, that is capable of converting a continuous ion beam into orthogonal ion pulses at about 10 kHz repetition, can be triggered asynchronously to ion pulses generated by DE MALDI source 22. Operation of an orthogonal TOF is well described in the prior art literature and well known to those of skill in the art. The accelerator 55 operates near ground potential. Ions are accelerated into a floated free flight tube 57, reflected in the ion mirror 58 and directed onto a detector 59. Spectra are acquired in a counting mode using a time to digital converter (TDC) 60 that receives the detector output.

Synchronization of the orthogonal pulse generator 56 of the o-TOF 27 may be done in different ways, depending on the time spread of the ion packet in the collision cell 26. In the case of a quasi-continuous ion beam the pulse generator 56 may run asynchronous to the pulsed ion source generator. A quasi-continuous beam could be obtained by increasing the pressure in the cell 26, using a longer quadrupole and by creating a slight retarding axial field at the aperture 50*c*. Producing a continuous beam is made easier by operating the pulsed ion source generator at high repetition rate, which also improves the signal intensity. Since all the voltages are moderate and all the pulses are within 1 kV, it is fairly trivial to operate the laser and all pulses at a few kHz repetition rate. The ion beam exiting the collision cell 26 may also be modulated in order to improve the duty cycle of the o-TOF 27, in which case modulation pulses are used to synchronize the o-TOF pulser 56 and the data acquisition system. A pulsed repelling voltage, applied to the quadrupole aperture 50*c* modulates the ion beam. At the time when a repelling potential is applied, the ions are retained inside the linear trap created by radial compression by the RF field, and axial compression by the retarding DC potentials on apertures 50*b* and 50*c*. When the repelling voltage on the aperture 50*c* is turned off, a short packet of ions is injected into orthogonal pulser of the o-TOF 27. Such a scheme is known to improve o-TOF duty cycle within a limited mass range.

Figure 3:
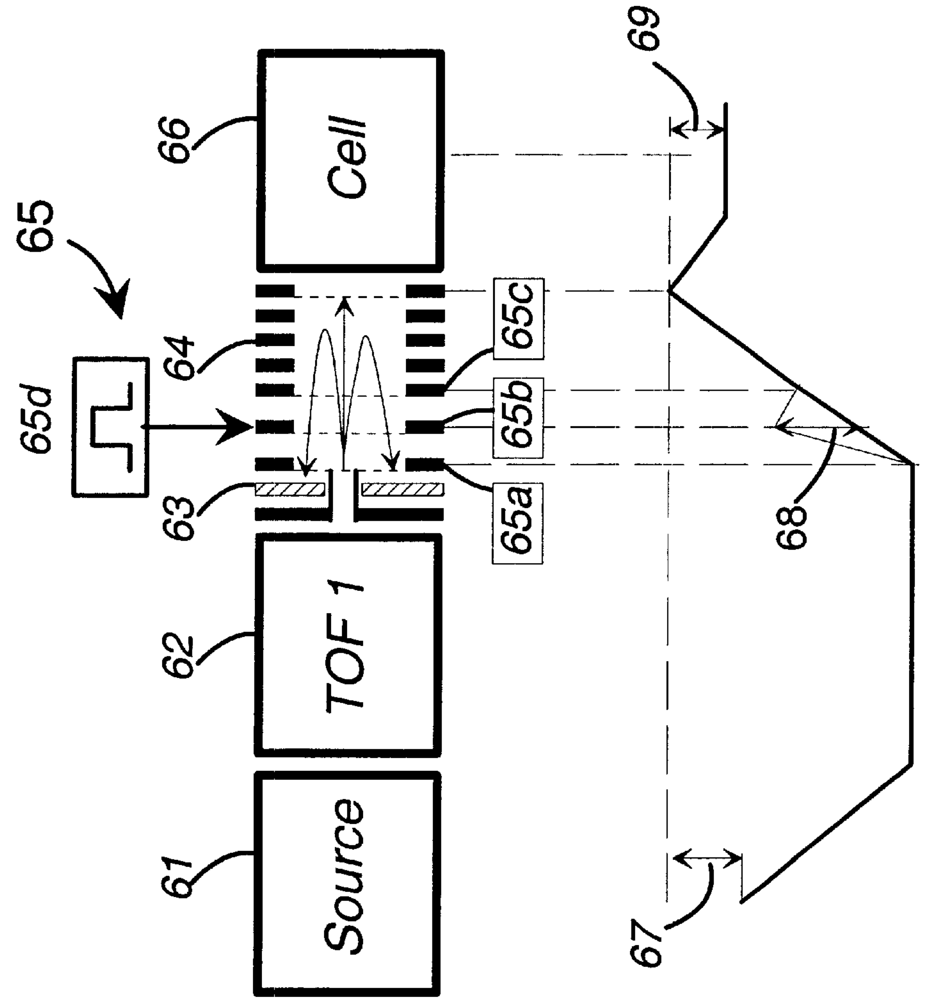
FIG. 3 is a schematic diagram of another embodiment of the invention with an alternative configuration for providing timed ion selection in the first TOF mass spectrometer.

Referring to FIG. 3, an alternative embodiment of a timed ion selector 65 is shown which operates as a pulsed accelerator to provide a higher resolution of ion selection. The timed ion selector 65 is composed of three meshes 65*a*, 65*b*, and 65*c* and is positioned between a decelerating electrode stack 64 and a collision cell 66. Mesh 65*a* also serves as a shield for an ion detector 63, while mesh 65*c* also serves as an entrance mesh of the decelerating stack 64. The middle mesh 65*b* is coupled to a pulse generator 65*d*, pulsing synchronously with the arrival of ions of interest.

Voltage distributions before the application of the pulse from the pulse generator 65*d* (wide line) and at the time the pulse is applied (thin line) are shown on FIG. 3 below the schematic diagram. Dashed vertical lines show correspondence between voltages and elements on the schematic diagram. The potential of the decelerating electrode stack 64 is adjusted above the voltage of the sample plate in an ion source 61. Without a pulse applied to the middle mesh 65*b* the entire ion beam has an energy deficit represented by potential difference 67 and can not pass through the decelerating electrode stack 64. Ions are reflected and strike the annular detector 63. The decelerating stack 64 in this instance serves as an ion mirror of a reflecting TOF MS configuration. If desired, the entire beam of primary ions can be time-focused onto the annular detector 63 and the primary beam ion could be analyzed for the purpose of MS-only analysis.

In order to select ions of interest, an accelerating pulse is applied to mesh 65*b*, synchronized with the arrival of ions of interest to the mesh. The amplitude 68 of the pulse is adjusted slightly above the potential difference 67. When the accelerating pulse is applied, ions of interest are flying in the vicinity of the middle mesh 65*b* and gain maximum acceleration, so that they can pass through the decelerating electrode stack 64. Ions of other M/Z values gain less energy and get reflected. The decelerating electrode stack also rejects metastable fragments formed in TOF1. After passing decelerating stack 64 the beam of selected ions is accelerated in front of the collision cell 66 to a desired energy in order to induce ion fragmentation in the cell. Potential difference 69 controls the minimum ion injection energy. The difference between pulse height 68 and potential 67 controls the energy spread of injected ions.

Resolution of ion selection in the above-described timed ion selector is limited by 5 to 10 eV energy spread, values typically obtained in a MALDI ion source. Resolution (R) can be estimated as: $R \sim (L*U*e)/(d*\Delta E)/2$, where L is the length of free flight tube, d is the distance between meshes of the ion selector, U is the height of the selector pulse. For L=30 cm, d=3 mm, U>600 V and $\Delta E<10$ eV, the resolution exceeds 1000.

Figure 4:
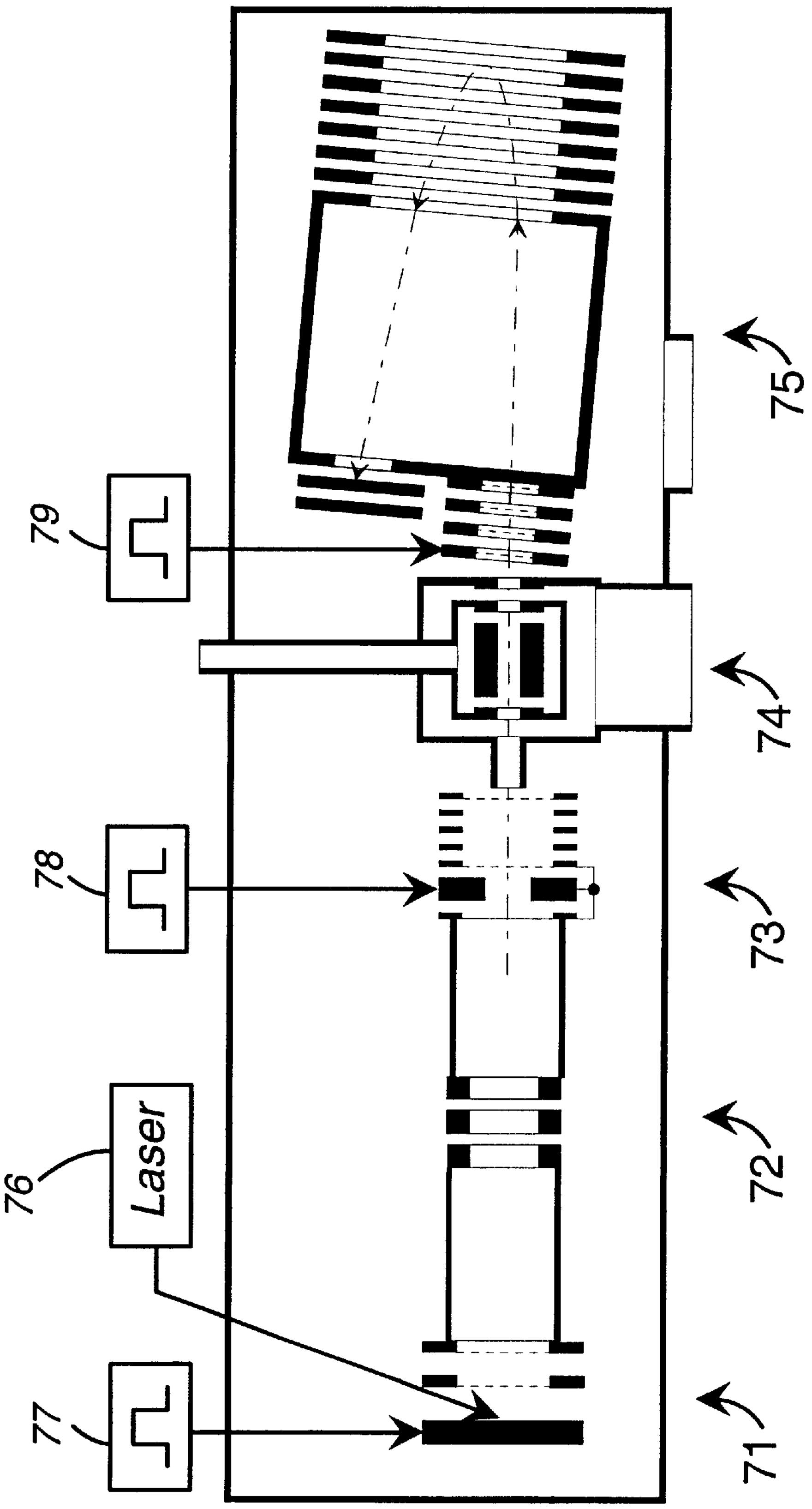
FIG. 4 is a schematic diagram of an embodiment of the invention wherein partial preservation of the ion pulse duration in a CID cell is achieved and including a coaxial TOF as the second mass spectrometer.

FIG. 4 shows an embodiment of the present invention that utilizes the modulated nature of an ion beam exiting a collision cell. The short collision cell provides a substantial damping of the energy of the ions, while still partially preserving the pulsed nature of the ion beam and the small length of ion packet. This embodiment includes a DE MALDI ion source 71, a TOF mass spectrometer 72, a timed ion selector 73, a short, high-pressure collision cell 74 and a TOF mass spectrometer 75. The cell 74 is about 1 cm long and is filled with gas at a pressure exceeding 100 mtorr. A weak axial DC electric field in the cell 74 accelerates the transition of ions through the cell. The short and slow packet of ions exiting the cell is than analyzed by the TOF mass spectrometer 75. In this embodiment, the TOF mass spectrometer 75 is an axial reflecting TOF MS with a pulsed acceleration, tuned to compensate for initial spatial spread. In another preferred particular case of this embodiment the second mass spectrometer is an o-TOF instrument. In this embodiment all the pulse generators 77 to 79 are synchronized to the triggering of laser 76 with the delay corresponding to ion flight time and propagation through the cell 74.

To demonstrate how to achieve partial damping, assume the collision cell 74 is 1 cm long and gas pressure in the cell is 100 mtorr. Such an arrangement provides sufficient thickness of the gas in the cell to support the required collisions. For typical peptide ions with $10^{-18}$ $m^2$ cross section and gas density of $3\times10^{-21}$ $m^3$, the ion free path is in the order of 0.3 mm. The RF field gives an additional swing to the ion trajectory, which increases the number of collisions per length of the cell. Primary ions experience at least 30 collisions in the cell, which is close to the ratio of ion mass to the mass of nitrogen molecules. Thus 1 kD ions will be slowed down substantially. After the initial drop of velocity the cross section increases because of polarization forces and damping becomes even more efficient. Fragment ions have smaller mass and thus will slow down even more efficiently than their parent ion. The slight axial field inside the multipole guide of ~100 V/m, formed either by fringing fields or by tilted rods, does not allow a complete stopping of the beam. See, for example, Mansoori et al., "Analytic Performance of a High-Pressure RF-Only Quadrupole Collision Cell with an Axial Field Applied Using Conical Rods, Proceedings of the $46^{th}$ ASMS Conference on Mass Spectrometry and Allied Topics, p. 1251, 1998. The drift velocity of ions, which is in the order of 100 m/s (thermal velocity), would not cause any additional heating and fragmentation of ions but will preserve the limited length of the packet. Considering a spatial spread of the ion beam less than a few free path lengths (say 1 mm), the time duration of the pulse will remain ~10 $\mu$s and the velocity ~100 m/s. Such a beam has marginal properties for good focusing in the axial TOF MS with pulsed acceleration. However, such a beam is compatible with a high repetition rate laser and a high repetition rate pulser (~10 kHz) when the second MS is an o-TOF MS and thus duty cycle losses are substantially eliminated in the o-TOF MS.

Figure 5:
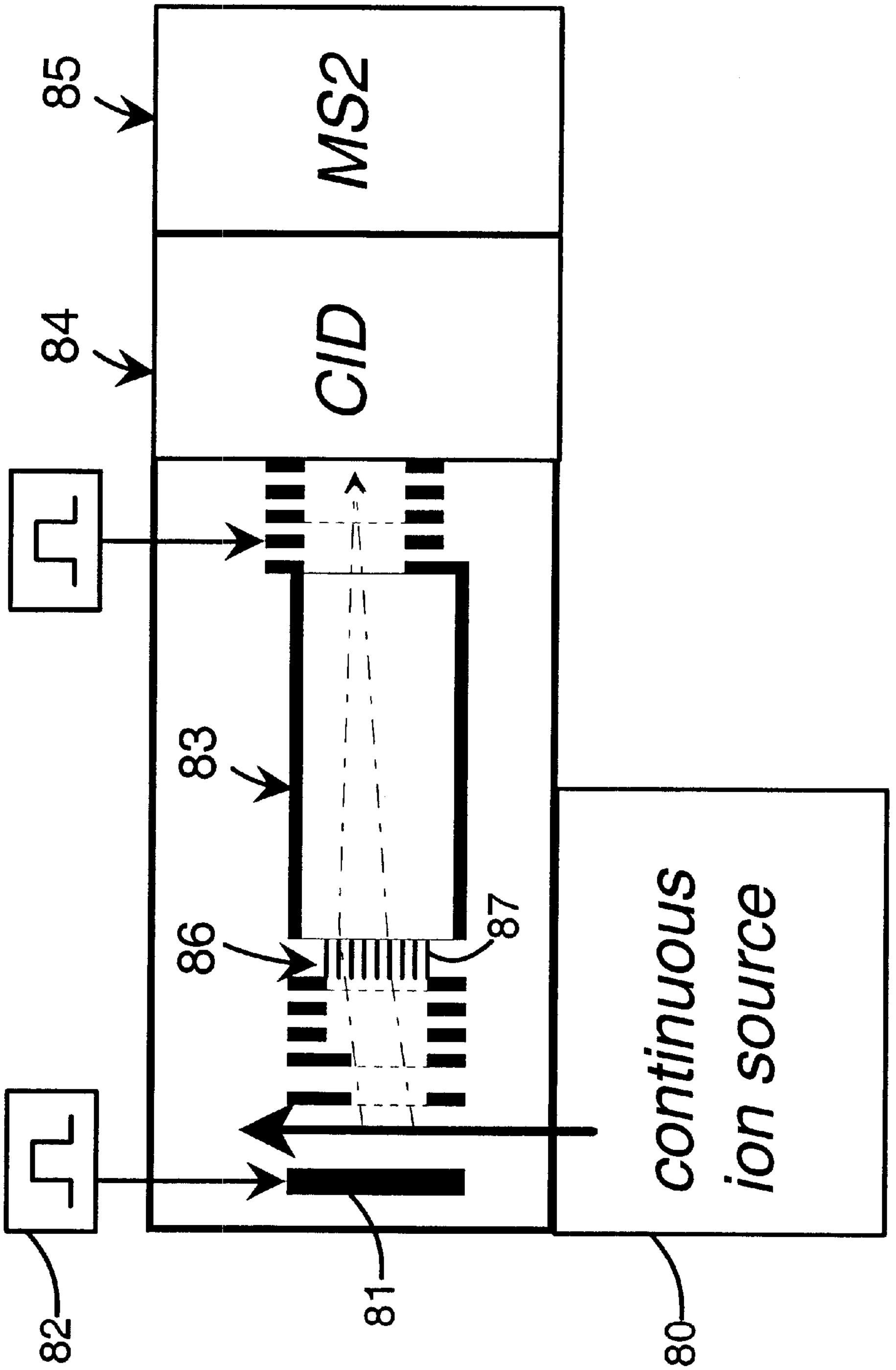
FIG. 5 is a schematic diagram of another embodiment of the invention useful for continuous ion sources.

In another embodiment shown in FIG. 5, the present invention is applied to continuous ion sources where a pulsed ion beam is created from a continuous ion beam by means of orthogonal pulsing. Continuous ion sources include those known in the art such as electrospray (ESI), chemical ionization at atmospheric pressure (APCI), electron impact ionization (EI), inductively coupled plasma (ICP) ionization and the like. A continuous ion beam from a source 80 is passed by an electrode 81, which receives a pulse from a pulse generator 82. This pulse provides an orthogonal acceleration of packets of ions, which are then injected into a linear TOF mass spectrometer 83. As similarly described with respect to the previous embodiments, the ion beam, after appropriate primary ion selection and deceleration, enters a CID cell 84, fragments, and is then transported to a second mass spectrometer (MS2) 85 for further analysis. In order to focus the ion beam onto the entrance of the CID cell and to preserve resolution of the TOF mass spectrometer 83, a lens 86 composed of multiple two-sided strips 87 focuses the elongated pulsed beam. Each individual strip acts like a pair of deflection plates. The deflection angles vary with the position of the strip. This arrangement allows focusing of an initially wide ion beam and for efficient ion transfer through the aperture of the collision cell 84. The preferred way of operating this multi-segment lens is to apply a voltage pulse while ions of interest are within the lens so as to minimize the time spread at focusing. When employing the above-described techniques for modulation of the beam, the scheme could be as sensitive as an MS-only o-TOF instrument.

Experimental Results

The principles and objectives of the present invention were tested using the TOF-o-TOF instrument shown and described with reference to FIG. 2 without the use of the second, decelerating pulse 35 and the elevator 44. Ions were produced in the MALDI ion source in DE mode in vacuum below $10^{-6}$ torr. A Nd-YAG laser was employed at 500 Hz repetition rate. After a 100 ns to 300 ns delay, the sample plate 31 was pulsed from a plate voltage (~500V) to a low potential of from 10 to 50V. Ions were time-separated in a 10 inch long linear TOF with the free-flight tube floated to −3000V, spatially focused onto the entrance of the cell 26. Ions of interest were selected by the pulsed deflection plates. Selected ions were decelerated in the decelerating electrode stack 46, and injected into the CID cell at low energy (10 to 50 eV), controlled by the potential difference between the sample plate and the cell chamber 49. Ions were collisionally damped in the cell at an intermediate gas pressure of about 30 mtorr. The first segment of the cell included the RF-only hexapole 52 with inscribed diameter of 15 mm and the second segment the RF-only quadrupole 53 with inscribed diameter 7 mm. Both multipoles were driven by a 2.5 MHz, 500V RF power supply. A 2V DC bias, superimposed onto the RF signal, was used to drive ions between stages. The hexapole was held at 7V DC and the quadrupole at 5V DC. The pulsed ion beam was converted into a quasi-continuous beam confined in the RF only quadrupole and then injected into an orthogonal TOF (Mariner™ MS instrument, PE Biosystems, Framingham, Mass.) for mass analysis. The orthogonal pulser of the Mariner instrument was run asynchronously with TOF1 at a 10 kHz repetition rate.

In a first experimental run a micro-channel plate detector was used instead of the orthogonal TOF. In these experiments the time focusing properties of TOF1 and the spatial focusing properties of einzel lens were verified. The cell was pumped below $10^{-6}$ torr and floated to acceleration potential, so that a high-energy ion beam could be transmitted through the cell. It was found that the ion beam was fully transmitted through the ⅛" apertures at acceleration voltage down to 1 kV. In the next run the cell was brought to a slight positive potential and filled with nitrogen gas to a pressure from 1 to 50 mtorr. Gas collisions in the cell slowed down the ion beam and caused the time spread of the ion signal. The total integral appeared to be lower compared to a vacuum case, indicating more than 10 fold losses of the ion beam. With the introduction of an RF signal on the hexapole guide and with the use of the decelerating cathode lens in front of the CID cell, the signal integral was recovered. These experiments verified that the ion beam can be fully injected into the cell even at low kinetic energy required when analyzing peptide ions (i.e., down to 10 eV). This also verified the collisional damping of the kinetic energy of the ions and the resultant full transmission through the CID cell.

In the following experiments the orthogonal TOF MS system 21 was re-installed to acquire MS-MS spectra. Collisional energy was adjusted by varying the voltage of the DE pulse. For example, at a DE pulse to +17 V the collisional energy is adjusted to 10 eV, since the hexapole was floated to +7V. It was found that the primary ions could be kept intact at low injection energies and with high gas pressure in the cell. In order to induce fragmentation the injection energies were kept in the range of about 30 eV per 1 kDa peptide. In MS only mode of operation, it is possible to acquire spectra of the primary ions (with the timed ion selector turned off) and then monitor the quality of ion selection and tune the TOF1 parameters including the timing of the selector. Thus by adjusting the DE pulse voltage it was possible to switch between MS-only and MS-MS analysis modes.

Figure 6B:
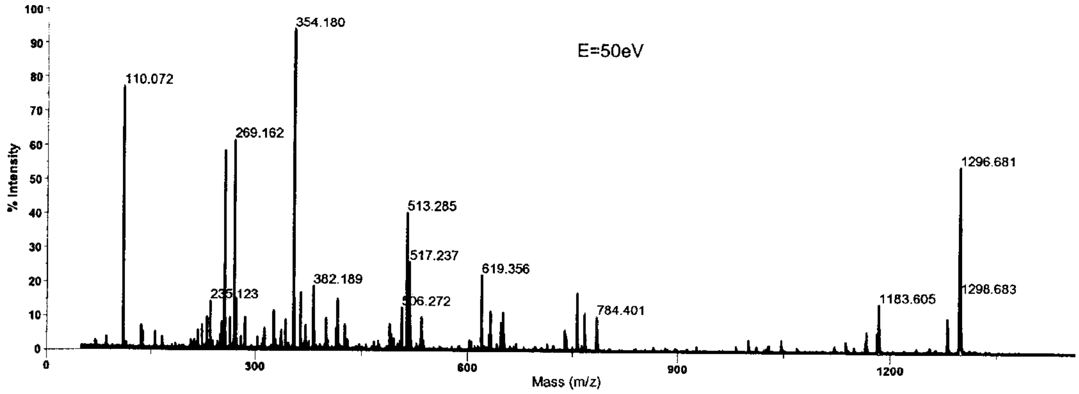
Figure 6C:
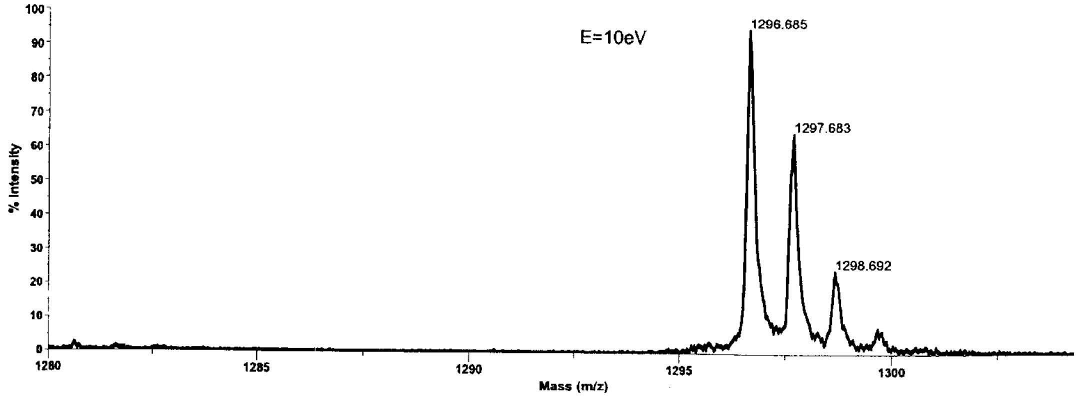

Referring to FIGS. 6A, B and C, spectra of the peptide angiotensin I are shown at various injection energies and at 30 mtorr gas pressure in the cell. At an energy level at 10 eV primary ions are well preserved (FIG. 6A). Intensity of fragment ion peaks is below 5% of the molecular peak intensity. At higher injection energy (50 eV) substantial fragmentation occurs, forming fragments of 'a' and 'b' type, containing structural information, sufficient for peptide identification (see FIG. 6B). As expected, the ion beam was fully damped in gas collisions and thus performance of second analyzer was not affected by injection energy. Fragment spectra reveal a linear calibration curve, resolution in excess of 5000 (FIG. 6C) and a low ppm mass accuracy uniform across the full mass range.

Having described preferred embodiments and some examples of combining useful elements, it will now become apparent to one of the skill in the art that other embodiments incorporating the concepts of the present invention may be used. It is felt, therefore, that these embodiments should not be limited to the disclosed embodiments, but rather the invention should be limited only by the spirit and the scope of the following claims.

What is claimed is:

1. A tandem mass spectrometer comprising:

a. a time-of-flight mass spectrometer comprising:

i. a pulsed ion generator;

ii. a timed ion selector positioned in a flight path of ions generated by the pulsed ion generator, the timed ion selector selecting ions of interest and rejecting substantially all other ions;

b. a collision cell positioned after the timed ion selector in the flight path of the selected ions, the collision cell having a sufficiently high gas pressure to substantially dampen the kinetic energy of the selected ions entering the collision cell and inducing fragmentation of the selected ions; and c. a second mass spectrometer coupled to an output of the collision cell, the second mass spectrometer analyzing the fragment ions generated by the time-of-flight mass spectrometer.

2. The mass spectrometer of claim 1 wherein the second mass spectrometer comprises an orthogonal time-of-flight mass spectrometer.

3. The mass spectrometer of claim 2 wherein the orthogonal time-of-flight mass spectrometer comprises an ion reflecting mass spectrometer.

4. The mass spectrometer of claim 1 wherein the second mass spectrometer is selected from the group consisting of time-of-flight, quadrupole, ion trap, Fourier transform or magnetic sector mass spectrometers.

5. The mass spectrometer of claim 1 wherein the pulsed generator of ions comprises a Delayed Extraction Matrix Assisted Laser Desorption/Ionization ion source (DE MALDI).

6. The mass spectrometer of claim 5 wherein the DE MALDI source comprises a laser that generates pulses having an energy at least two times higher than an ionization threshold energy.

7. The mass spectrometer of claim 1 wherein the time-of-flight mass spectrometer comprises a linear time-of-flight mass spectrometer having a floated field-free region and a spatial-focusing lens.

8. The mass spectrometer of claim 1 further comprising electrodes positioned between the timed ion selector and the collision cell, the electrodes adjusting a kinetic energy of the selected ions.

9. The mass spectrometer of claim 8 wherein the electrodes are biased by a dynamic potential.

10. The mass spectrometer of claim 8 wherein the electrodes are biased by a pulse generator.

11. The mass spectrometer of claim 8 wherein the electrodes comprise at least one of a decelerator and an elevator electrode.

12. The mass spectrometer of claim 8 wherein the electrodes comprise an elevator electrode biased by a dynamic potential and a decelerator electrode biased by a static potential.

13. The mass spectrometer of claim 8 wherein the electrodes are positioned proximate to a field-free region, a pulse applied to the electrode at a time that controls a kinetic energy of the selected ions independent of an initial kinetic energy of the generated ions.

14. The mass spectrometer of claim 13 wherein the time corresponds to a time when the selected ions enter into the field free region.

15. The mass spectrometer of claim 5 wherein the DE MALDI source comprises a sample plate, an extraction plate, and an accelerating mesh, each of the sample plate, the extraction plate, and the accelerating mesh being coupled to at least one pulse generator that produces a first pulse at a pre-determined time that accelerates ions formed by the DE MALDI source, the at least one pulse generator producing a second pulse at a time corresponding to when the selected ions enter a region between the extraction plate and the accelerating mesh.

16. The mass spectrometer of claim 1 wherein the timed ion selector comprises three meshes, a middle mesh of the three meshes being synchronously pulsed at a time corresponding to an arrival of the selected ions.

17. The mass spectrometer of claim 1 wherein the ion selector comprises a pair of pulsed deflection plates surrounded by meshes electrically coupled to a pulse generator.

18. The mass spectrometer of claim 1 wherein the collision cell has a sufficiently high gas pressure to dampen the kinetic energy of the selected ions entering the collision cell at or below about ten times a thermal energy of the selected ions.

19. The mass spectrometer of claim 1 wherein the collision cell comprises an RF-only multipole and wherein the collision cell spreads the ion beam in time, whereby a pulsed beam of ions from the pulsed ion generator becomes a quasi-continuous beam that propagates along an axis of the collision cell.

20. The mass spectrometer of claim 19 wherein the RF multipole confines ions radially along a longitudinal axis of the collision cell, the confined ions being pulse-ejected from the collision cell by modulation of a potential applied to an exit aperture of the collision cell.

21. The mass spectrometer of claim 1 wherein the collision cell converts a pulsed beam of primary ions into an asynchronously pulsed beam of fragment ions, thereby improving a sensitivity of the second mass spectrometer.

22. The mass spectrometer of claim 1 wherein the pressure in the collision cell is maintained between about 10 and 100 mtorr.

23. The mass spectrometer of claim 1 wherein the pressure in the collision cell is maintained above 30 mtorr.

24. The mass spectrometer of claim 1 wherein a gas in the collision cell comprises methane.

25. The mass spectrometer of claim 2 wherein an axial length of the collision cell is dimensioned to improve pulse integrity of a beam of primary ions, thereby improving sensitivity of the orthogonal time-of-flight mass spectrometer.

26. The mass spectrometer of claim 2 wherein the collision cell is differentially pumped to increase ion transmission through the cell.

27. The mass spectrometer of claim 1 wherein the collision cell comprises an aperture axially dimensioned to increase a cross section of the aperture, thereby improving transmission of an ion beam at a given gas load.

28. The mass spectrometer of claim 8 wherein the collision cell comprises two sections separated by an aperture, each of the two sections including a multipole having an inscribed diameter, the multipole in one of the two sections being positioned proximate to the electrodes having an inscribed diameter greater than the inscribed diameter of the multipole in the other of the two sections.

29. The mass spectrometer of claim 1 wherein the pulsed ion generator comprises a continuous ion source pulsed by an orthogonal acceleration potential and a lens that spatial focuses the resultant pulsed ion beam.

30. The mass spectrometer of claim 29 wherein the continuous ion source comprises an electrospray (ESI) ion source.

31. A tandem mass spectrometer comprising:

a. a Delayed Extraction Matrix Assisted Laser Desorption/Ionization (DE MALDI) ion source;

b. a timed ion selector positioned in a flight path of ions generated by the DE MALDI ion source, the timed ion selector selecting ions of interest and rejecting substantially all other ions;

c. electrodes positioned between the timed ion selector and the collision cell, the electrodes adjusting a kinetic energy of the selected ions;

d. a collision cell positioned after the timed ion selector in the flight path of the selected ions, the collision cell having a sufficiently high gas pressure to substantially dampen the kinetic energy of the selected ions entering the collision cell, thereby inducing fragmentation of the selected ions; and e. an orthogonal time-of-flight mass spectrometer coupled to an output of the collision cell, the second mass spectrometer analyzing the fragment ions generated by the time-of-flight mass spectrometer.

32. A method for tandem mass spectroscopy, the method comprising:

a. generating a pulse of ions from a sample of interest in a time-of-flight mass spectrometer;

b. selecting ions of interest from the pulse of ions in the time-of-flight mass spectrometer;

c. colliding the selected ions with a gas having a sufficiently high gas pressure to substantially dampen the kinetic energy of the selected ions and inducing fragmentation of the selected ions; and d. analyzing the selected ions and fragments thereof with a second mass spectrometer.

33. The method of claim 32 further comprising adjusting a kinetic energy of the selected ions that collide with the gas, thereby adjusting a degree of ion fragmentation.

34. The method of claim 32 further comprising applying an electric field proximate to the selected ions.

35. The method of claim 34 wherein the at least one electrode is biased with a dynamic potential.

36. The method of claim 32 further comprising the step of decelerating the selected ions before colliding the selected ions with a gas.

37. The method of claim 32 wherein an ion beam of the fragment ions is converted into a pulsed ion beam, thereby improving sensitivity of the second mass spectrometer.

38. The method of claim 32 wherein the pulsed ion beam is formed from a continuous ion beam by applying pulses of an orthogonal electric field.

* * * * *